Aug. 14, 1951　　　　D. LANUZA　　　　2,564,014

SYSTEM FOR RECEIVING COMMUNICATION SIGNALS WITHOUT DISTURBANCE

Filed July 9, 1947　　　　3 Sheets-Sheet 1

Inventor:
D. Lanuza
By E. F. Wenderoth
Atty

Aug. 14, 1951

D. LANUZA
SYSTEM FOR RECEIVING COMMUNICATION
SIGNALS WITHOUT DISTURBANCE 2,564,014

Filed July 9, 1947

3 Sheets-Sheet 2

Inventor:
D. Lanuza
By E. F. Wenderoth
Atty.

Aug. 14, 1951 D. LANUZA 2,564,014
SYSTEM FOR RECEIVING COMMUNICATION SIGNALS WITHOUT DISTURBANCE
Filed July 9, 1947 3 Sheets-Sheet 3
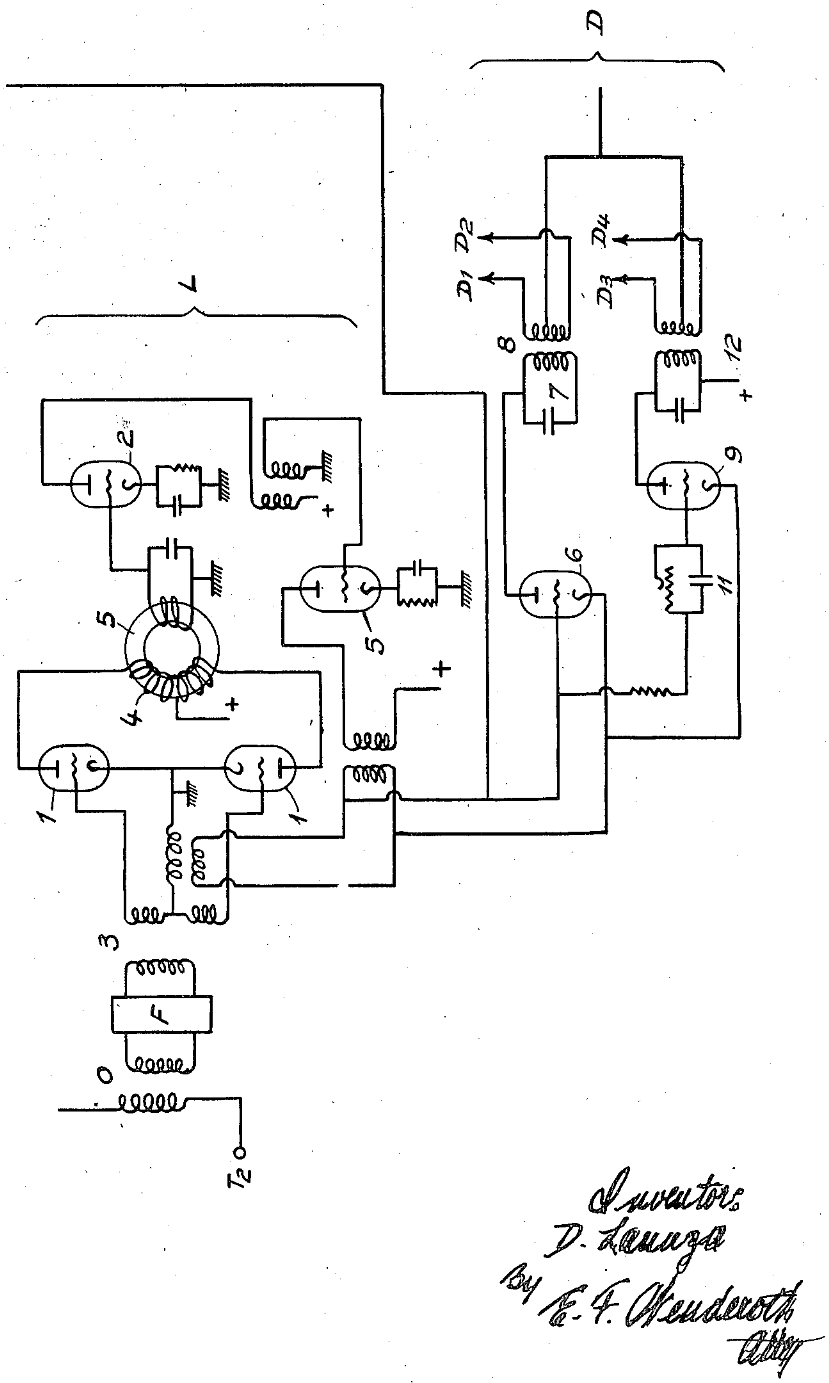
FIG. 2 bis
Inventor:
D. Lanuza
By E. F. Wenderoth
Atty Patented Aug. 14, 1951 2,564,014

UNITED STATES PATENT OFFICE 2,564,014

SYSTEM FOR RECEIVING COMMUNICATION SIGNALS WITHOUT DISTURBANCE

Delfin Lanuza, Levallois-Perret, France, assignor of one-third to Andre A. Carlier, Neuilly-sur-Seine, France Application July 9, 1947, Serial No. 759,851

7 Claims. (Cl. 250—20)

The present invention relates to the reception of signal carrier waves.

Its object is the provision of an improved system for receiving communication signals making it possible to select the carrier waves of communication signals and ensure the practically complete protection of said signals against disturbance or noise. This system, as a result of its said selective properties, thus makes it possible to increase the transmission capacity of any multiplex-operated transmission system.

The system for receiving communication signals according the invention is of the synchronous reception type. It is applicable to broadcasting, radio-telephony and radio-telegraphy transmission, and also to the selection of the different multiplex transmission channels both in telegraph and telephone transmission systems. It also makes it possible to reduce the band width of frequency bands as used in television.

In the ensuing disclosure, my invention is described as applied to a radio receiving system for noiseless reception. It is assumed in this disclosure that the wave is an ampltiude-modulated one, but it will be understood however that my invention is applicable to any other type of modulation.

In the disclosure, reference is made to the accompanying drawings wherein.

Fig. 2*b* is a wiring diagram of the oscillator and frequency doubler stages.

Figure 3:
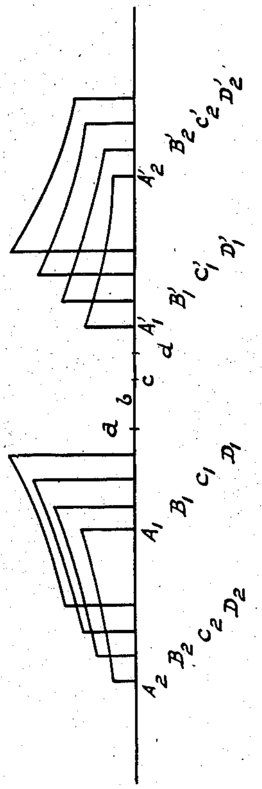

Fig. 3 shows a diagram of the frequency spectra in multiplex operation.

Figure 4:
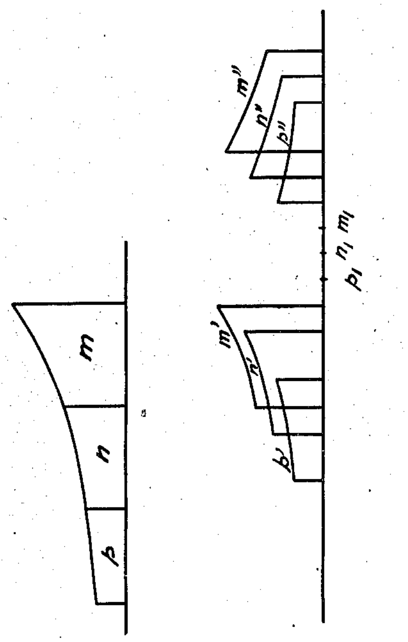

Fig. 4 is an explanatory diagram relating to one application of my method.

The basic principle of my invention consists of opposing to a useful received wave a local oscillation having the same frequency and the same phase characteristics as the carrier wave of the useful signal, and causing the amplitude of said local oscillation to vary until a resultant is obtained which is independent of the signal and is a function only of the noise or disturbance component.

The amplitude of the local oscillation is automatically subjected to corrections until the incident wave is completely suppressed.

This automatic amplitude adjustment is effected by comparing the resultant of the whole of the noise or disturbance components and the images thereof with the resultant obtained by eliminating the useful signal, as a result of the symmetry of two component side-bands of the signal (homodyne operation).

Figure 1:
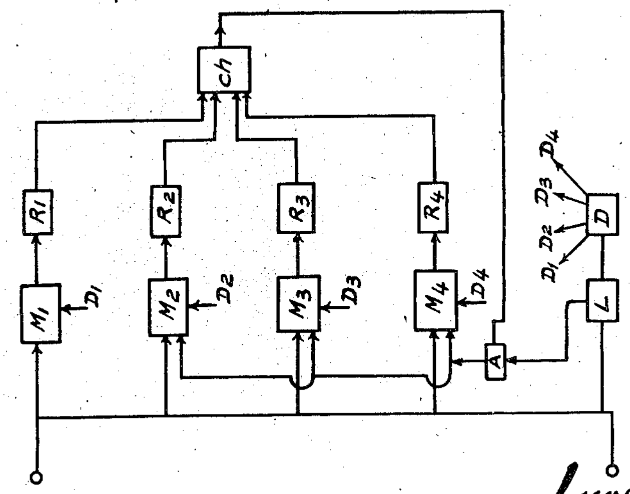
Fig. 1 is a block or functional diagram of my system.

In the block diagram of the system as shown in Fig. 1, the resultants which are compared to determine the proper amplitude which is to be maintained for the local oscillation, are the low-frequency resultants due to the detection of the disturbances, but the same result could also be obtained by comparing other resultants due to said disturbances.

The local oscillation L is synchronized by the carrier wave of the signal to be received and from this local oscillation a double frequency D is obtained. The input circuits of four mixer tubes M1, M2, M3, M4 are simultaneously actuated by the incident wave.

The first tube M1 in order to produce the desired interference effect, makes use of the double frequency D1 in phase opposition with the carrier wave. In the output of the tube, there is obtained, tuned on the frequency of the signal, a combined output which is independent of the signal, said output including only the disturbances and the images of the disturbances as produced by their interference with said double frequency.

The second tube M2 for producing the desired interference effect makes use of the double frequency D2 in phase with the carrier wave. On the said tube, the incident wave has superimposed therewith, firstly the oscillation D2 and secondly the local oscillation L as amplified by means of an amplifier A whose rate of amplification is automatically adjusted in order at each instant to obtain a neutralization of the incident wave in a manner to be presently described.

Assuming that the amplitude as determined by the amplifier A corresponds to the amplitude of the signal, the output circuit of the tube M2 (which circuit is identical to that of the tube M1) will contain only the disturbances and the disturbance images with respect to the double frequency in phase with the signal.

Examination of the low frequency resultants obtained beyond the outputs of the detector stages R1 and R2 shows that both are comparable to each other as to the constitution of the basic and harmonic components therein and that, after those resultants have been combined, only the harmonics of even denomination remain (always assuming that elimination of the signal is effected in the tubes M1 and M2).

In order to eliminate the greater part of the harmonics, the tubes M3 and M4 are used. The input of both said tubes is, as in the case of the tube M2, actuated by the incident wave, and the local oscillation from the output of the amplifier A, but the intermodulation is effected by means of double frequencies in quarter-wave phase displaced relation with the carrier wave. The tube M3 is subjected to the action of a frequency D3 double the frequency of the carrier wave of the useful signal and 90° in advance with respect thereto. The tube M4 is itself subjected to the action of a frequency D4 double the carrier wave frequency and with a 90° lag with respect thereto. At the output of the detector stages R3 and R4, low frequency resultants are obtained which are similar to those obtained at the outputs of R1 and R2 assuming that the suppression of the signal has been completely achieved.

In such conditions, the resultant of the rectified output currents from the four detector stages R1, R2, R3, R4 if suitably connected will be zero.

The resultant of said rectified outputs is at a non-zero value if the complete suppression of the signal by the tubes M2, M3, M4 has not been achieved, which is due to the fact that the amplitude of the oscillation as determined by the amplifier A does not correspond to the amplitude of the received signal.

Automatically, this non-zero value of the resultant sets into action the amplitude senser Ch which modifies the amplification in the amplifier A until an equilibrium condition, that is suppression of the signal is obtained.

The means used for synchronizing the local oscillation through the carrier or pilot wave is diagrammatically illustrated at L. From the local oscillation thus synchronized, the double frequency oscillation is obtained by a simple detection step.

Figure 2:
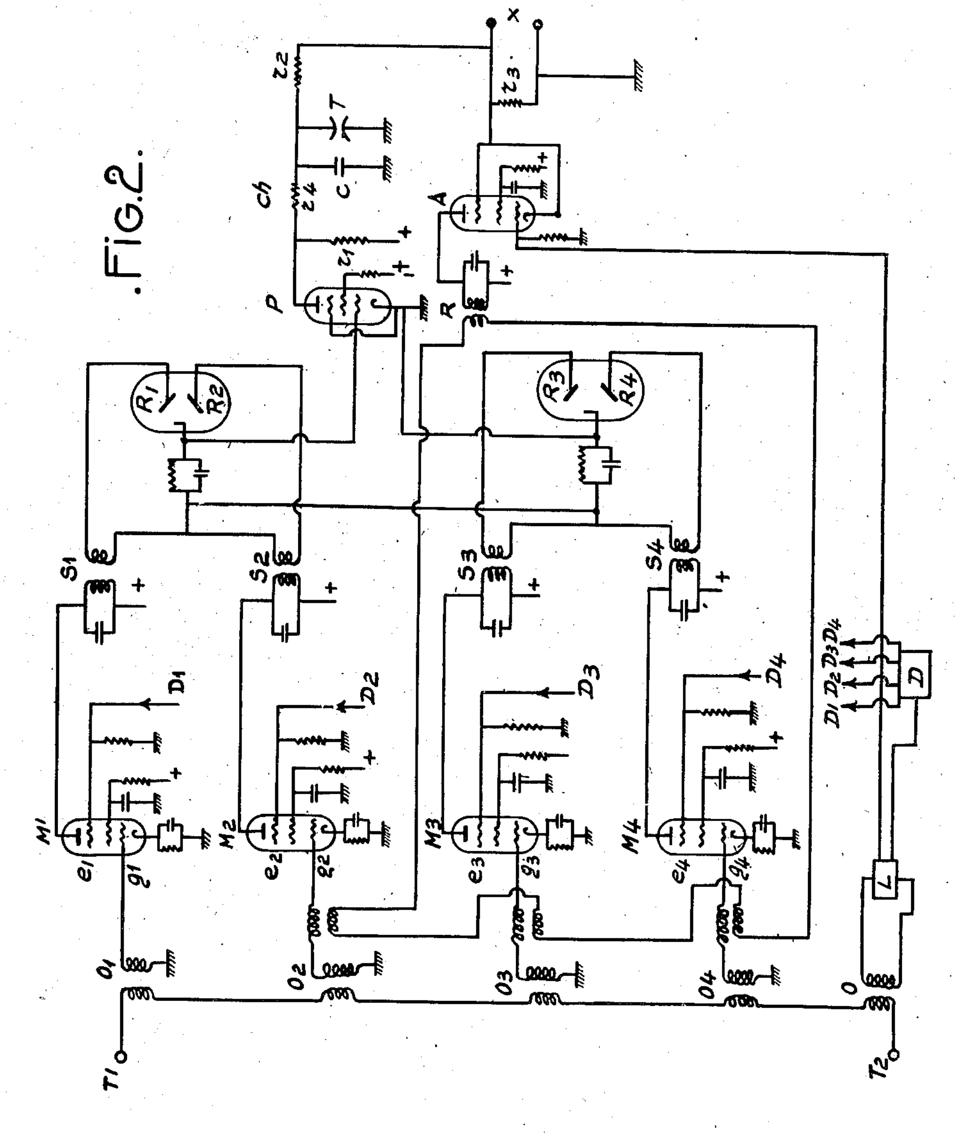
Fig. 2 is a wiring diagram of an embodiment.

A practical embodiment of this invention is shown in Figs. 2 and 2*b* in which the same references have been used as in Fig. 1.

The synchronizing system proper is formed (Fig. 2*b*) in known manner. It comprises two detector tubes 1 and 1′ the grids of which are simultaneously energized by the signal carrier wave (separated from the side-bands by means of a filter F) and by the local wave from the oscillator 2. A transformer 3 enables the grids of the detectors 1 and 1′ to be subjected to phases which are in opposition to each other. O is the input transformer of filter F.

The currents rectified by the detector tubes 1 and 1′ are caused to flow in reverse directions through the winding 4 of a variable-current inductor 5 having a magnetic core, so as to mutually counteract each other so long as they are of equal magnitude. As soon as the signal carrier wave is no longer in phase quadrature relation with the local oscillation, the resultant current is no longer zero and there is a current flow through the winding 4, causing a variation in the magnetic flux through the magnetic circuit of said winding. Variations result therefrom in the grid voltages of the local oscillator 2 and consequently variations in the frequency characteristics of the tuned circuit of said oscillator tube.

The tube 10 is an ordinary amplifier tube which serves simply to separate the input from the local oscillator and feed the tubes 1, 1′, 6 and 9 through the transformers 14 and 15.

The step which comprises doubling the frequency and producing the phase components D1, D2, D3, D4 which are to be fed to the mixer tubes M1, M2, M3 and M4 is accomplished as shown in Fig. 2*b*.

Where detection is effected as in the example shown, the frequency-doubling step is accomplished by the tube 6, the output circuit 7 of which removes the harmonic 2 produced by said detection. The transformer 8 provided with a central tap enables two opposite phases D1 and D2 to be obtained.

The other frequency-doubler tube 9 identical with the foregoing one operates in the same manner. In its output circuit 12, there is also obtained a double frequency, but the phase shifting circuit 11 makes it possible by adjustment of the variable resistor in said circuit to obtain a 45° phase displacement for the simple frequency, that is a 90° phase displacement for the double frequency. By means of a transformer 12 provided with a central tap, two phases D3 and D4 are therefore obtained.

The general wiring diagram of an embodiment of receiving system proper according to my invention is shown in Fig. 2. The mixer tubes M1, M2, M3, M4 are pentodes, the grids *g*1, *g*2, *g*3, *g*4 of which are connected with circuits *o*1, *o*2, *o*3, *o*4 coupled with the signal input device T1, T2, the local oscillator itself being coupled at 0 with the latter through the synchronizing system. The screen grids of said pentodes *e*1, *e*2, *e*3, *e*4 are actuated by the oscillations of a frequency which is double the frequency of the carrier wave of the useful signal and the phase angles of which respectively are in opposition (D1), in phase (D2), in quarter wave lead (D3) and in quarter wave lag (D4) relation with said signal; the output circuits S1, S2, S3, S4 of said tubes are identical circuits tuned on the signal wave; the detector tubes R1, R2, R3, R4 are diodes and the combined series of those detector tubes is connected with the control grid of a pentode P which controls the amplitude senser unit C*h* to be presently described in detail.

In the mixer tubes $M_1$, $M_2$, $M_3$, $M_4$, the whole of the incident waves, including both the useful signal and disturbances, is heterodyned by the local frequency oscillations which are double the signal carrier wave frequency. The phase of heterodynation of the local wave is different in each tube and has the respective values specified above. Consequently, in the output circuits $S_1$, $S_2$, $S_3$, $S_4$, tuned, as said above, to the frequency of the carrier wave of the useful signal, four groups of waves are obtained which are independent of the useful signal, and depend only on the disturbances, having the same amplitudes and different phases.

Since the four detectors $R_1$, $R_2$, $R_3$, $R_4$ are fed with waves having the same amplitude, the products put out by them have identical D.-C. components. Suitable connection will therefore yield a zero resultant output, such zero condition therefore indicating either the absence of any useful signal, or else the presence of the desired condition in which the local oscillation L, as amplified by tube A and applied on the inner grids of tubes M2, M3, M4 has the proper amplitude value for effecting cancellation of the useful signal.

If the amplitude of the reinjected wave is incorrect, i. e. if such annulment of the signal is not obtained, the senser unit, now to be described will, in response to the resulting absence of equilibrium, modify the said amplitude until the zero condition again prevails.

The senser unit C*h* comprises a condenser C which is charged through the resistor $r4$ with the voltage obtained across $r1$. The resistors $r1$, $r2$, $r3$, $r4$ and the capacity value of C are predetermined so as to have a time constant which is low as compared to the time constant corresponding to the greatest modulation frequency for which the receiver is designed. In parallel with the condenser C, there is connected a gas tube T, for instance a neon tube, the purpose of which is to shortcircuit the condenser C when the voltage across said condenser reaches firing potential.

The oscillations thus generated are applied to the cathode of the amplifier tube A and cause the grid bias of said tube to vary within wide limits.

Since however said grid is on the other hand actuated by the local synchronized oscillation L, the amplitude of the oscillation which is at the same frequency and the same phase as L which is picked up at R, varies at a rate as determined by the time constant of the senser unit. Since this rate is high, the effect of the signal applied to the grids $g2$, $g3$, $g4$ of the tubes M2, M3, M4 by transformers T2, T3, T4 is consequently rapidly suppressed.

In the absence of any signal, when the senser unit is in a balanced condition, the tubes P and A are both adapted to be in suitable condition: for P, the operating point is the one for which the control grid potential is zero on the plate characteristic "IpUg"; for A, which is e. g. a sharp cut-off pentode, the operating point is on the threshold of electronic emission by a selection of the relative values of resistors $r1$, $r2$, $r3$, $r4$.

The appearance of a useful signal destroys the above equilibrium, as previously explained. The grid $g_P$ of P assumes a negative value, since it is connected to the negative polarity of the combination of the output elements of the four rectifiers; the flow of electrons is immediately reduced in P causing a reduction of the voltage drop across the resistor $r1$ and, consequently, the following effects in the circuit: the potential of the plate $P_p$ increases, the charge of the condenser C increases proportionately, the corresponding voltage drop across $r3$ is greater and the negative biasing voltage of the grid $g4$ with respect to the cathode (and the suppressor grid) in tube A is reduced. As the said tube A controls the amplitude under which the local synchronized wave is re-injected into the grids $g2$, $g3$, $g4$ of the follow-up channel tubes M2, M3, M4 the said local synchronized wave increases. As previously stated, this re-injected input opposes its action to that of the useful signal.

As soon as the said condition of unbalance appears, the condenser C is charged according to an exponential law as predetermined by the relative values imparted to the constituent elements of the senser unit circuit assembly. The bias of tube A, and consequently the amplitude of the re-injected local synchronized wave, are both varied according to a common law of variation as a function of time.

The amplitude of the re-injected wave L increases up to a value for which balance is restored. Thereafter the plate potential of the tube P returns to its normal value and the condenser C is again discharged according to its exponential law, whereby the amplitude of the local wave L in the reinjection circuit is reduced. Full cancellation of the useful signal is no longer made on the grids of the tubes in the follow-up channels; the state of unbalance thus obtained is again expressed as a reduction of the electron flow through P, an increase of the charge of C and a correlative increase in the amplitude of L up to a point where balance is once again restored. This process is repeated throughout the duration of the signal, at a rapid rate as determined by the time constant of the capacitance and resistance elements of the senser unit.

As a result of the sensing process just described, and due to the fact that the determining cause of unbalance, as soon as a signal appears and throughout the duration of such signal, is the discharge of the condenser (said discharge being more marked as the amplitude of the incoming wave increases and less marked as said amplitude decreases), the envelope curve of the difference of potential between the electrodes of condenser C will thus follow with substantial accuracy the configuration of the incoming useful signal. This envelope curve thus constitutes a good replica of the signal free of disturbance and is used in the load apparatus connected across the output of the senser circuits at the terminals of resistor $r3$. Because the frequency rate of the succession of condenser charges and discharges is high, this frequency may easily be eliminated in the load apparatus.

The fact the discharge of condenser C is the determining factor of the unbalance eliminates any uncertainty as to the sense of the correction be made.

The gas tube T is provided in order to insure that the senser unit will operate correctly under all circumstances. Thus, assuming that for one reason or another, upon the receiver picking up a given transmission wave, the amplitude of the local wave L was higher than that of the incoming signal, the unbalance voltage drop, as expressed by the four rectifiers R1, R2, R3, R4 would cause the amplitude of L to increase a further amount, thereby further increasing the magnitude of the unbalance. The tube T however is adapted to be ionized as the voltage across the condenser C attains such critical value. The condenser discharges by an amount sufficient to cut off the tube. Electronic emission is arrested. The condenser recharges and thereafter the operation of the senser unit proceeds as described previously.

Where the amplitude of the incoming signal is too high with respect to that of the local wave L, the senser assembly is incapable of cancelling said signal without distorsion. In such an event, continued operation of the gas tube T will warn the operator that the amplitude of the incoming signal should be reduced.

The embodiment which has just been described is adapted for radio reception when the input is connected to the medium frequency output of the receiver and the elements are calculated for said medium frequency value. It is equally applicable for separating the various transmission channels of a multiplex system when the input is directly operated by the line currents and the elements are calculated for the frequencies to be separated.

Fig. 3 is a conventional explanatory showing of the frequency spectrum of a multiplex system with channels A, B, C, D which in the diagram have been distinguished by the use of unequal amplitudes; this condition however is not in accordance with actual practice and has been adopted merely to clarify the disclosure.

The arrangement of said transmission channels as produced at the transmitter is peculiar. The two side-bands of each channel $$(A_1A_2-A'_1A'_2)-(B_1B_2-B'_1B'_2)\ \ldots$$

symmetrically disposed with respect to their carrier waves whether suppressed or not $$(a, b, c\ \ldots)$$

overlap each other. In these conditions, the above-defined method is still applicable to obtain proper separation between the various channels.

The displacement $aA'1$ of the frequencies of the individual spectrum for each communication, which displacement is necessary in order to accommodate a plurality of channels according to the invention, may easily be corrected or compensated for at the receiver when the magnitude of said displacement is known.

The method of the invention also makes it possible to provide a solution for yet another important problem, namely the transmission, with a transmission means only enabling transmission on a limited frequency range, of frequency bands the width of which exceeds that which said system is adapted to transmit. It is simply necessary for that purpose to divide the frequency range to be transmitted into sections overlapping each other to obtain an arrangement similar to that of Fig. 3. Fig. 4 diagrammatically illustrates such operation. The frequency band to be transmitted is subdivided into a number of sections *mnp* which, after transposition, occupy the positions $m'n'p$—$m''n''p''$ after modulation of the suppressed carrier waves $m_1n_1p_1$. Those various side-bands are then easily transmitted and, at the receiver, after separation according to the method and repositioning, the original modulation is obtained.

Throughout the specification and claims, certain expressions have been used for convenience in referring to the phase relationships of the synchronized local oscillation with the derived oscillations having a frequency double that of said synchronized local oscillation. Said expressions are to be understood as follows, both in the specification and the claims:

The expressions "phase opposition" or "out of phase" are intended herein to mean that at a zero time selected as origin for a cycle for both oscillations to be compared, the synchronized local oscillation passes through a positive maximum value while the double frequency oscillation derived therefrom passes through a negative maximum value. In other words, when the synchronized local oscillation passes through zero, the double-frequency oscillation passes through a positive maximum value. And when the synchronized local oscillation passes through a (positive or negative) maximum value, the double-frequency oscillation passes through a negative maximum value.

Similarly the expression "in phase" is to be understood herein as meaning that at a zero time selected as origin for a cycle for both oscillations, both the initial oscillation and the double-frequency oscillation pass through a positive maximum value. In other words, when the initial oscillation passes through zero, the double frequency oscillation passes through a negative maximum value. When the initial oscillation passes through a (positive or negative) maximum, the double-frequency oscillation passes through a positive maximum value.

The meanings of expressions such as "quarter-phase lead" and "quarter-phase lag," or the like, may be defined as signifying that the double-frequency wave is displaced one quarter-cycle forward or backwards from its relative position in phase with the initial wave, as defined hereinabove.

I claim:

1. In a system for receiving communication signals, in combination, a local oscillator with means for synchronizing the same with the carrier wave of said signal, a phase-selective frequency-doubler means fed from said oscillator and providing four double-frequency oscillation components, one in phase-opposition, one in co-phasal, one in quarter-wave lead and one in quarter-wave lag relation with said carrier wave, a first mixer channel supplied with said communication signal wave and said phase-opposition double-frequency component, a second, a third and a fourth mixer channels, each supplied with said communication signal wave, and the said local oscillation and further respectively supplied with said co-phasal, quarter-wave lead and quarter-wave lag component, variable amplifier means fed from said oscillator and feeding each of said last-mentioned three mixer channels, individual rectifier means for the output of each channel and means for combining the rectified mixed outputs into a resultant output, and amplitude-senser means controlling said variable amplifier means and fed from said local oscillator and from said resultant output, said senser means comprising a capacitor and resistance circuit responding by a state of unstable balance of the charge of said capacitor to the zero-condition of said resultant output, said senser means controlling said variable amplifier to continually impart to said local oscillation an instantaneous amplitude value proportionate to the charge of said capacitor, whereby said resultant output will substantially remain at said zero-condition and the mean value of said senser output will constitute a substantial replica of said useful signal, and a load apparatus connected across said senser output.

2. System as in claim 1 wherein said variable amplifier comprises a thermionic tube and said senser means controls said variable amplifier by imparting to the grid bias thereof successive variable increments proportionate to the charge of said capacitor followed by substantially constant decrements proportionate to the discharge of said capacitor, at a rate, as determined by the time constant of said capacitor and resistance circuit, considerably higher than the maximum frequency of said communication signals.

3. System as in claim 2 wherein said senser means further comrises a gas-discharge tube associated with said capacitor and adapted to be fired upon said capacitor reaching a critical charge voltage to thereby partially discharge said capacitor.

4. System as in claim 3 wherein each mixer channel comprises a multi-grid tube.

5. In a system for receiving communication signals, in combination, a local oscillator with means for synchronizing the same with the carrier wave of said signal, a phase-selective frequency-doubler means fed from said local oscillator and providing four double-frequency oscillation components, one in phase-opposition, one in co-phasal, one in quarter-wave lag relation with said carrier wave, a first mixer channel supplied with said communication wave and with said phase-opposition double-frequency component, three other mixer channels supplied with said communication wave, said local oscillation and respectively said co-phasal, said quarter-wave lead and said quarter-wave lag double-frequency components, variable amplifier means fed from said oscillator and feeding each of said three other mixer channels, means for rectifying the output of each channel, means for combining the rectified outputs of said channels, and means controlling said variable amplifier for continually imparting to the amplitude of the local oscillation an instantaneous value proportional with that of the amplitude of said signal whereby a zero condition is continually maintained for said combined output and the sequence of said instantaneous values will constitute a substantial disturbance-free replica of said useful signal, and a load apparatus for receiving said sequence of instantaneous values.

6. System as in claim 5 wherein said means controlling said variable amplifier comprises a capacitance-and-resistance circuit having a time constant such as to provide a number of relaxation oscillations considerably higher than the maximum frequency of said useful communication signals to be received.

7. In an electric system comprising a local oscillator, in combination, variable amplifier means for the output of said local oscillator, and mixer channels for mixing the variably-amplified local oscillation with a complex wave including a useful component, to produce a mixed output, means for rectifying said mixer output, and senser means for maintaining said mixed output at a predetermined reference condition comprising, a capacitor and resistance circuit responding by a state of unstable balance of the charge of said capacitor to said reference condition of said resultant output, said senser means controlling said variable amplifier to continually impart to said amplified local oscillation an instantaneous amplitude value proportionate to the charge of said capacitor, whereby said resultant output will substantially remain at said reference condition and the means value of said senser output will constitute a substantial replica of said useful component.

DELFIN LANUZA.

REFERENCES CITED

The following references are of record in the file of this patent:

UNITED STATES PATENTS

| Number | Name | Date |
|---|---|---|
| 2,288,575 | Stablein | June 30, 1942 |